US012614020B2

(12) United States Patent
Chen et al.

(10) Patent No.: US 12,614,020 B2
(45) Date of Patent: Apr. 28, 2026

(54) DOCUMENT EDITING METHOD AND APPARATUS, AND TERMINAL AND NON-TRANSITORY STORAGE MEDIUM

(71) Applicant: BEIJING ZITIAO NETWORK TECHNOLOGY CO., LTD., Beijing (CN)

(72) Inventors: Xuejia Chen, Beijing (CN); Ruiming Zhuang, Beijing (CN)

(73) Assignee: BEIJING ZITIAO NETWORK TECHNOLOGY CO., LTD., Beijing (CN)

( * ) Notice: Subject to any disclaimer, the term of this patent is extended or adjusted under 35 U.S.C. 154(b) by 93 days.

(21) Appl. No.: 18/279,548

(22) PCT Filed: Mar. 2, 2022

(86) PCT No.: PCT/CN2022/078727
§ 371 (c)(1),
(2) Date: Aug. 30, 2023

(87) PCT Pub. No.: WO2022/184077
PCT Pub. Date: Sep. 9, 2022

(65) Prior Publication Data
US 2024/0303413 A1 Sep. 12, 2024

(30) Foreign Application Priority Data
Mar. 2, 2021 (CN) .......................... 202110232005.7

(51) Int. Cl.
*G06F 40/166* (2020.01)
*G06F 40/106* (2020.01)
(52) U.S. Cl.
CPC .......... *G06F 40/166* (2020.01); *G06F 40/106* (2020.01)

(58) Field of Classification Search
None
See application file for complete search history.

(56) References Cited

U.S. PATENT DOCUMENTS

| | | | |
|---|---|---|---|
| 7,370,315 B1 * | 5/2008 | Lovell ..................... | G06F 8/355 |
| | | | 717/109 |
| 9,946,691 B2 * | 4/2018 | Grigorovitch ........ | G06F 16/972 |

(Continued)

FOREIGN PATENT DOCUMENTS

| | | |
|---|---|---|
| CN | 101493839 A | 7/2009 |
| CN | 102662928 A | 9/2012 |

(Continued)

OTHER PUBLICATIONS

International Patent Application No. PCT/CN2022/078727; Int'l Search Report; dated May 26, 2022; 2 pages.

(Continued)

*Primary Examiner* — William L Bashore
*Assistant Examiner* — Koorosh Nehchiri
(74) *Attorney, Agent, or Firm* — BakerHostetler

(57) ABSTRACT

Embodiments of the disclosure provide a method and an apparatus for document editing, a terminal, and a non-transitory storage medium. The method includes: in response to receiving a first creation operation in a document, creating a first content block, wherein the first content block comprises an interactive region and the first content block is of a first type; generating a first editing region in response to a first triggering operation on the first content block, the first editing region being configured to edit the first content block; and updating content of the interactive region of the first content block in the document based on input information received in the first editing region. The document editing method provided by the disclosure is capable of providing an extended compilation function.

13 Claims, 4 Drawing Sheets

Create a first content block in response to receiving a first creation operation in a document — S100

Generate a first editing region in response to a first triggering operation on the first content block — S200

Update content of the interactive region of the first content block in the document based on input information received in the first editing region — S300

(56) References Cited

U.S. PATENT DOCUMENTS

| | | | |
|---|---|---|---|
| 2004/0205644 A1 | 10/2004 | Shaughnessy et al. | |
| 2010/0293523 A1* | 11/2010 | Ahadian | G06F 8/30 |
| | | | 707/E17.055 |
| 2011/0087959 A1 | 4/2011 | Qiu et al. | |
| 2012/0072367 A1* | 3/2012 | Reisbich | G06Q 10/067 |
| | | | 715/764 |
| 2013/0117657 A1* | 5/2013 | Verlaan | G06F 40/186 |
| | | | 715/234 |
| 2014/0059521 A1* | 2/2014 | Voliter | G06F 9/45516 |
| | | | 717/125 |
| 2015/0046799 A1 | 2/2015 | Isidore | |
| 2016/0170720 A1* | 6/2016 | Xue | G06F 8/34 |
| | | | 717/113 |
| 2017/0228711 A1* | 8/2017 | Chawla | G06Q 20/384 |
| 2019/0013007 A1* | 1/2019 | Boxwell | G10L 13/07 |
| 2019/0311022 A1* | 10/2019 | Fan | G06F 40/166 |
| 2020/0233879 A1 | 7/2020 | Papanicolaou et al. | |
| 2021/0103380 A1* | 4/2021 | Saw | G06F 3/04845 |
| 2021/0334456 A1* | 10/2021 | Zeng | G06F 40/166 |

FOREIGN PATENT DOCUMENTS

| | | | |
|---|---|---|---|
| CN | 104239317 A | 12/2014 | |
| CN | 105144153 A | 12/2015 | |
| CN | 106096049 A | 11/2016 | |
| CN | 106202021 A | 12/2016 | |
| CN | 109948102 A | 6/2019 | |
| CN | 110582018 A | 12/2019 | |
| CN | 111985203 A | 11/2020 | |
| CN | 112306595 A | 2/2021 | |

OTHER PUBLICATIONS

Written Opinion for International Application No. PCT/CN2022/078727, mailed May 26, 2022, 8 Pages.

First Office Action for Chinese Application No. 202110232005.7, mailed on Jan. 25, 2025, 13 pages.

Guanhui D., et al., "Research and Implementation of Visual Graphics Tools Based on Page Flow," Computer Knowledge and Technology, Issue S2, Nov. 25, 2008. p. 66-67 (Englsish Abstract only).

China Patent Application No. 202110232005.7; Second Office Action; dated Aug. 19, 2025; 18 pages.

"GoodNess"; https://www.cnblogs.com/goodness2010/archive/2010/03/25/1695241.html; Goodness; Mar. 2010; accessed Nov. 3, 2025; 6 pages.

China Patent Application No. 202110232005.7; Notification to Grant; dated Jan. 15, 2026; 6 pages.

* cited by examiner

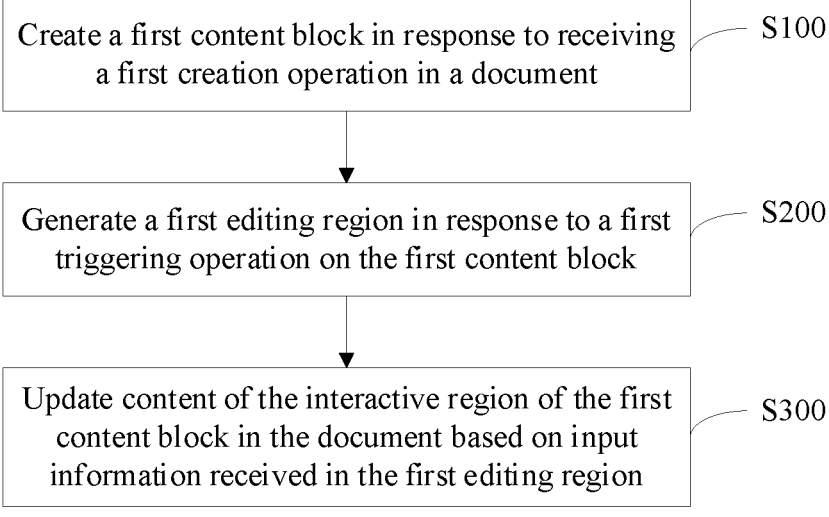

```
┌────────────────────────────────────────┐
│ Create a first content block in response to receiving │ ── S100
│    a first creation operation in a document    │
└────────────────────────────────────────┘
                    │
                    ▼
┌────────────────────────────────────────┐
│ Generate a first editing region in response to a first │ ── S200
│   triggering operation on the first content block   │
└────────────────────────────────────────┘
                    │
                    ▼
┌────────────────────────────────────────┐
│ Update content of the interactive region of the first │ ── S300
│   content block in the document based on input   │
│  information received in the first editing region  │
└────────────────────────────────────────┘
```

FIG. 1

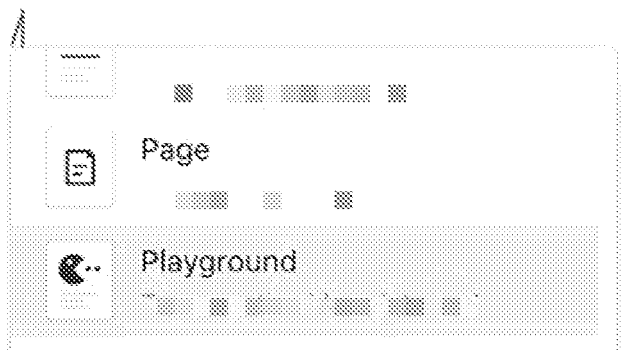

FIG. 2

```
CSS    Snapshot                                                        ▶    ⌗
1   import { Rate } from 'https://cdn.jsdelivr.net/npm/antd@4.6.5/dist/antd.min.js';
2   import 'https://cdn.jsdelivr.net/npm/antd@4.6.5/dist/antd.min.css';
3
4   export default class Demo extends VirtualBlock {
5     onChange = (newVal) => {
6       this.props.applyTransaction('updateValue', op => op.replace(['value'], newVal));
7     }
8
9     render() {
10      const { value } = this.props.record.snapshot;
11      return (
12        <Rate allowHalf value={value} onChange={this.onChange} />
13      )
14    }
15  }
```

DOCUMENT EDITING METHOD AND APPARATUS, AND TERMINAL AND NON-TRANSITORY STORAGE MEDIUM

CROSS REFERENCE TO RELATED APPLICATIONS

The disclosure is the U.S. National Stage of International Application No. PCT/CN2022/078727, titled "DOCUMENT EDITING METHOD AND APPARATUS, AND TERMINAL AND NON-TRANSITORY STORAGE MEDIUM", filed on Mar. 2, 2022, which claims priority to Chinese Patent Application No. 202110232005.7, field on Mar. 2, 2021, titled "DOCUMENT EDITING METHOD AND APPARATUS, AND TERMINAL AND NON-TRANSITORY STORAGE MEDIUM", the entire contents of both of which are incorporated herein by reference.

TECHNICAL FIELD

The disclosure relates to the field of computer technology, and more particularly, to a method and an apparatus for document editing, a terminal, and a non-transitory storage medium.

BACKGROUND

Conventional documents can express limited information and user can only edit content according to functions provided by the documents, but users' demands are varied and it is difficult to meet various demands through limited functions.

SUMMARY

This summary is provided to introduce concepts in a simplified form, and the concepts are described in detail below in the detailed description. This summary is not intended to identify key features or essential features of the claimed technical solutions, nor is it intended to be used to limit the scope of the claimed technical solutions.

In order to solve the above problems, the disclosure provides a method and an apparatus for document editing, a terminal, and a non-transitory storage medium.

One aspect of the disclosure provides a method for document editing, comprising:

in response to receiving a first creation operation in a document, creating a first content block, wherein the first content block comprises an interactive region and the first content block is of a first type;

generating a first editing region in response to a first triggering operation on the first content block, the first editing region being configured to edit the first content block; and updating content of the interactive region of the first content block in the document based on input information received in the first editing region.

Another aspect of the disclosure provides a method for document editing, comprising:

in response to receiving a second creation operation in a document, creating a second content block, wherein the second content block is of a second type, the second content block comprises a second editing region, and the second editing region is configured to edit the document;

in response to a third triggering operation on the second content block, generating a third editing region, the third editing region being configured to compile the second content block; and updating a block type and/or content of the second content block in the document based on input information received in the third editing region.

An apparatus for document editing, comprising:

a creation module, configured to, in response to receiving a first creation operation in a document, create a first content block, wherein the first content block comprises an interactive region and the first content block is of a first type;

a generation module, configured to generate a first editing region in response to a first triggering operation on the first content block, the first editing region being configured to edit the first content block; and an updating module, configured to update content of the interactive region of the first content block in the document based on input information received in the first editing region.

Yet another aspect of the disclosure provides an apparatus for document editing, comprising:

a creation module, configured to, in response to receiving a second creation operation in a document, create a second content block, wherein the second content block is of a second type, the second content block comprises a second editing region, and the second editing region is configured to edit the document;

a generation module, configured to, in response to a third triggering operation on the second content block, generate a third editing region, the third editing region being configured to compile the second content block; and an updating module, configured to update a block type and/or content of the second content block in the document based on input information received in the third editing region.

Yet another aspect of the disclosure provides a terminal, comprising: at least one memory and at least one processor; wherein the at least one memory is configured to store program code, and the at least one processor is configured to execute the program code stored by the at least one memory to perform the method provided by the embodiments of the disclosure.

Yet another aspect of the disclosure provides a non-transitory storage medium, storing program instructions that upon execution by a computing device, cause the computing device to perform the method provided by the embodiments of the disclosure.

The document editing solution of the disclosure is capable of providing an extended compilation function.

BRIEF DESCRIPTION OF FIGURES

The above and other features, advantages, and aspects of embodiments of the disclosure will become more apparent by reference to the following detailed description when taken in conjunction with the accompanying drawings. Throughout the drawings, the same or similar reference numerals refer to the same or similar elements. It should be understood that the figures are schematic and components and elements are not necessarily drawn to scale.

FIG. 1 illustrates a flowchart of a document editing method according to an embodiment of the present disclosure.

FIG. 2 illustrates a schematic diagram of calling an operation panel according to an embodiment of the present disclosure.

FIG. 3 illustrates a schematic diagram of a first editing region according to an embodiment of the present disclosure.

DETAILED DESCRIPTION OF THE EMBODIMENTS

Figure 4:
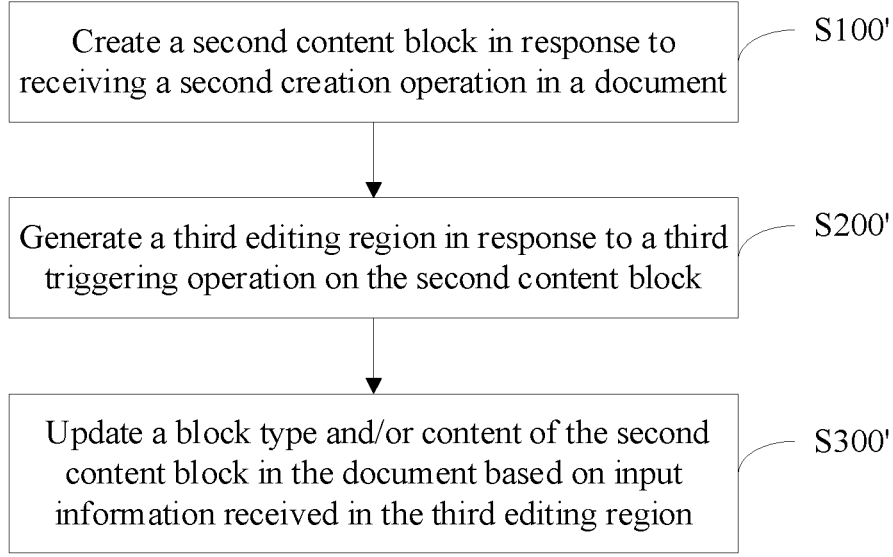
FIG. 4 illustrates a flowchart of a method for document editing according to another embodiment of the present disclosure.

Embodiments of the disclosure will be described in more detail below with reference to the accompanying drawings. While certain embodiments of the disclosure are illustrated in the accompanying drawings, it should be understood that the disclosure may be embodied in various forms and should not be construed as limited to the embodiments set forth herein, but rather, these embodiments are provided for a more thorough and complete understanding of the disclosure. It should be understood that the figures and embodiments of the disclosure are for exemplary purposes only and are not intended to limit the scope of the present disclosure.

It should be understood that the steps described in the embodiments of the disclosure may be performed according to different orders and/or in parallel. In addition, the embodiments may include additional steps and/or omit the execution of the shown steps. The scope of the disclosure is not limited in this aspect.

As used herein, the term "comprising" used herein and variants thereof means open-ended including, i.e., "comprising, but not limited to". The term "based on" refers to "based at least in part on". The term "one embodiment" represents "at least one embodiment"; the term "the other embodiment" represents "at least one additional embodiment"; and the term "some embodiments" represents "at least some embodiments".

It should be noted that the terms such as "first", "second" and the like mentioned in the disclosure are merely intended to distinguish different devices, modules, or units, rather than limiting an order of functions executed by these devices, modules or units or an interdependence among these devices, modules, or units.

It should be noted that the modifications of "a" and "multiple" mentioned in the disclosure are illustrative, but are not restrictive. It should be understood by those skilled in the art that it should be understood as "one or more" unless otherwise specified in the context.

The terminal in the disclosure may include, but is not limited to, a mobile terminal device such as a mobile phone, a smart phone, a notebook computer, a PDA (Personal Digital Assistant), a PAD (Tablet Computer), a PMP (Portable Multimedia Player), a navigation device, an in-vehicle terminal device, an in-vehicle display terminal, an in-vehicle electronic rearview mirror, etc. and a fixed terminal device such as a digital TV, a desktop computer, etc.

As shown in FIG. 1, the disclosure provides a flowchart of a method for document editing according to an embodiment, including the following steps.

S100, in response to receiving a first creation operation in a document, a first content block is created, wherein the first content block includes an interactive region, and the first content block is of a first type.

In some embodiments, the interactive region of the embodiment of the disclosure may be used to display the editing result, and the first type may include a type of playground, wherein the playground is only a temporary name of the content block, and may also be named in other arbitrary names, which is not limited herein. More specifically, the document according to an embodiment of the disclosure may be composed of various content blocks, or the data of the document may be stored based on the content blocks. By organizing the document into a plurality of separate content blocks, the content of each part of the document corresponding to each content block can be separately referenced, collected and co-edited. Users can customize the content blocks according to their needs to extend the expressive capability of a document. The interactive region is configured to receive an input instruction from a user and update the display content based on the input instruction. In some embodiments, the interactive region provides a component or control and an instruction from a user for the component or control is received to update the display content of the component or control. In some embodiments, the component or control provided by the interactive region has predetermined content displayed therein, and the user may input an instruction based on the predetermined content, and the displayed content of the interactive region is updated within a scope of predetermined content for the component or control in response to the input instruction.

S200, a first editing region is generated in response to a first triggering operation on the first content block, the first editing region being configured to edit the first content block.

In an embodiment of the disclosure, the interactive region is replaced by the first editing region, or the first editing region is displayed in an associated region of the interactive region, wherein the interactive region and the first editing region are displayed simultaneously. In some embodiments, the interactive region may be connected to the first editing region by a boundary. In some embodiments, a component or control of the interactive region may be edited by the first editing region, the component or control being generated based on the editing result.

In one embodiment of the disclosure, the first editing region may be generated through a variety of trigger modes. Such as shown in FIG. 2, the operation panel is called by inputting a predetermined symbol such as "/" in the document, and Playground is selected to expand the first editing region, as shown in FIG. 3. After expanding the first editing region, compilation can be performed, which can be done by triggering the top right icon to enter the full screen mode to create a custom content block.

In an embodiment of the present disclosure, in addition to custom compilation, the content of a third party database may be introduced during compilation. The method provided an embodiment of the disclosure may include the following steps: a connection file is created; a target module is retrieved in a database through the connection file; a dependency tree of the target module is obtained; and the target module is recursively parsed based on the dependency tree to obtain a target file. In some embodiments, the step that the connection file is created includes: a call instruction is obtained; the call instruction is replaced with a target instruction; and the target instruction is taken as the connection file, wherein the target module includes an asynchronous module, a global variable export module and a cascading style sheets module. Since third party databases may have a format incompatibility problem, an embodiment of the disclosure provides an addressing method that can perform addressing based on a predetermined path or class library name. For example, when the asynchronous module needs to be retrieved, a connection file is created, the asynchronous module is retrieved from the database via the connection file and a dependency tree is obtained, wherein the connection file may include a target instruction resulting from conversion of a call instruction, and the asynchronous module is recursively parsed based on the dependency tree. In addition to the asynchronous module, the target module of an embodiment of the disclosure may also be a global variable export module, a cascading style sheets module, or other modules.

In some embodiments, the method may further include the following steps: the first editing region is hidden; or the display scale of the first editing region is adjusted, for example, the display scale of the first editing region is reduced. By hiding the editing region or reducing the display scale of the editing region, such as reducing height, running result of the compiled content block can be displayed.

S300, content of an interactive region of the first content block is updated in the document based on input information received in the first editing region.

In some embodiments of the disclosure, the method may include the step of updating content of the interactive region in real-time in response to input information received in the first editing region. When the interactive region and the first editing region are simultaneously displayed, the method may further comprise: receiving a second triggering operation at an interface where the first editing region is located, and in response to the second triggering operation, updating the content of the interactive region of the first content block in the document.

In an embodiment of the disclosure, instruction information for re-editing the content block may be acquired, the content block is re-edited based on the instruction information, and an editing result is acquired. In an embodiment, the device that compiles the block is defined as the host, a sender of the instruction information is determined, if the sender is not the host, the instruction information is sent to the host, the instruction information is executed by the host, and the recompilation result is returned to the sender. In an embodiment, the instruction information may include a replacing operation, an inserting operation, a removing operation, or the like.

In an embodiment of the present disclosure, the created content block may be recompiled, and the compiler is not limited to the creator, i.e., the host, but may also include other devices. In particular, the modification operation may be performed by the host when other devices initiate recompilation. For example, a custom block may be inherited from a virtual block, wherein the Inheritance can make subclasses have attributes and methods of parent classes or redefine and append attributes and methods, and the virtual block can read and modify data. The virtual block will not begin rendering until it receives data from the host, and the data content may contain all data that the current content block can access and modify. By modifying data, various operations including, but not limited to, replacement, insertion, removal, and the like, may be performed. The operations described above may be sent to the host in a form of a message, which is processed by the host by parsing the message. Upon data modification, the virtual block may be driven to render the modified data. The data for the content block may include data such as the block code written, data generated when the block is run, and the height of the content block. A refresh operation can be avoided after the other terminal sends a modification message to the host for modification, and the host returns to the other terminal for rendering. In an embodiment of the disclosure, persistent data may be read and write through a port such as an application programming interface, the data may be coordinated based on operation conversion. The operation conversion of the embodiment of the disclosure may be a method for maintaining coherency of different data copies in a cooperative technique, such as adjusting operations according to different operation sequences at different terminals to maintain data coherency.

As shown in FIG. 4, FIG. 4 shows a flowchart of a method for document editing of another embodiment of the present disclosure, including the following steps:

At step S100', in response to receiving a second creation operation in a document, a second content block is created; wherein the second content block is of a second type, the second content block includes a second editing region, the second editing region is configured to edit the document. The second type may include a non-playground type. The second editing region is configured to receive an editing operation of a user, and corresponding content is recorded in the editing region based on the editing operation.

At step S200', in response to a third triggering operation on the second content block, a third editing region is generated, the third editing region being configured to compile the second content block.

At step S300', a block type and/or content of the second content block is updated in the document based on input information received in the third editing region. In some embodiments, based on the input information received by the third editing region, the type and content of the second content block may be modified simultaneously, or only the type or content of the second content block may be modified, wherein when only the content of the second content block is modified, it has an equivalent operational effect as receiving the editing operation at the second editing region.

Different from step S300, in step S300', the content block of the second type may be converted into the content block of the first type, and other relevant part can refer to the description of the previous embodiment, which will not be repeated here.

In some embodiments, the step that the third editing region is generated includes the second editing region is replaced with the third editing region.

In some embodiments, prior to updating the block type and/or content of the second content block in the document, the method further includes:

a fourth triggering operation is received at an interface where the third editing region is located; a block type and/or content of the second content block is updated in the document in response to the fourth triggering operation.

In some embodiments, the step that the third editing region is generated includes: the third editing region is generated at an associated region of the second editing region, wherein the second editing region and the third editing region are displayed simultaneously.

In some embodiments, the step that a block type and/or content of the second content block is updated in the document based on input information received in the third editing region includes: the block type and/or content of the second content block is updated in real time in response to the input information received in the third editing region.

In some embodiments, the third editing region is hidden; or a display scale of the third editing region is adjusted.

In some embodiments, a connection file is created; a target module is retrieved in a database through the connection file; a dependency tree of the target module is obtained; and the target module is recursively parsed according to the dependency tree to obtain a target file.

In some embodiments, the step that the connection file is created includes: a call instruction is obtained; the call instruction is replaced with a target instruction; and the target instruction is taken as the connection file; wherein the target module includes an asynchronous module, a global variable derivation module and a cascading style sheet module.

In some embodiments, instruction information to re-edit the content block is obtained; and the content block is re-edited according to the instruction information, and an editing result is obtained.

In some embodiments, a creator of the content block is defined as a host; a sender of the instruction information is determined; if the sender is not the host, the instruction information is sent to the host, the instruction information is executed by the host; and the recompilation result is returned to the sender, wherein the instruction information includes a replacing operation, an inserting operation, and a removing operation.

Figure 5:
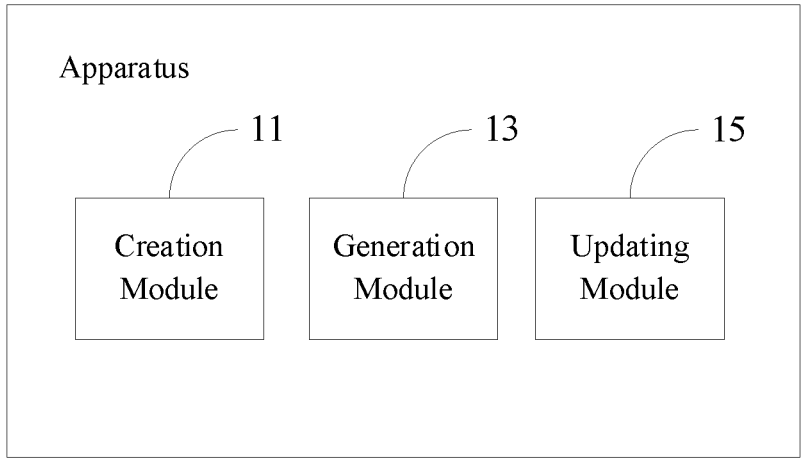
FIG. 5 illustrates a structural schematic diagram of an apparatus for document editing according to an embodiment of the present disclosure.

As shown in FIG. 5, which illustrates a schematic structure of a document editing device of an embodiment of the present disclosure. Refer to FIG. 5, the device 10 may include a creation module 11, a generation module 13, and an update module 15. The creation module 11 is configured to in response to receiving a first creation operation in a document, create a first content block, wherein the first content block comprises an interactive region and the first content block is of a first type; or the creation module is configured to in response to receiving a second creation operation in a document, create a second content block, wherein the second content block is of a second type, the second content block comprises a second editing region, and the second editing region is configured to edit the document. The generation module 13 is configured to generate a first editing region in response to a first triggering operation on the first content block, the first editing region being configured to edit the first content block; or the generation module 13 is configured to in response to a third triggering operation on the second content block, generate a third editing region, the third editing region being configured to compile the second content block. The update module 15 is configured to update content of the interactive region of the first content block in the document based on input information received in the first editing region or configured to update a block type and/or content of the second content block in the document based on input information received in the third editing region. In some embodiments, the device 10 may further include a defining module for defining a creator of the content block as a host, an acquisition module for acquiring instruction information for re-editing the content block, and a determination module for determining a sender of the instruction information.

Since the apparatus embodiment basically corresponds to the method embodiments, the relevant part can refer to the part of the description of the method embodiments. The apparatus embodiment described above is merely illustrative, and the units described as separate units may or may not be separate. Some or all of the units can be selected according to actual needs to achieve the objects of the solutions of the embodiments. Those of ordinary skill in the art can understand and implement without creative work.

Correspondingly, the disclosure further provides a terminal comprising: at least one processor; and at least one memory communicatively coupled to the at least one processor and storing instructions that upon execution by the at least one processor cause the terminal to perform the method for presenting information on a lock screen interface provided by one or more embodiments according to the disclosure.

Correspondingly, the disclosure further provides a non-transitory computer storage medium storing program instructions that upon execution by a computing device, cause the computing device to perform the method for presenting information on a lock screen interface provided by one or more embodiments according to the disclosure.

Figure 6:
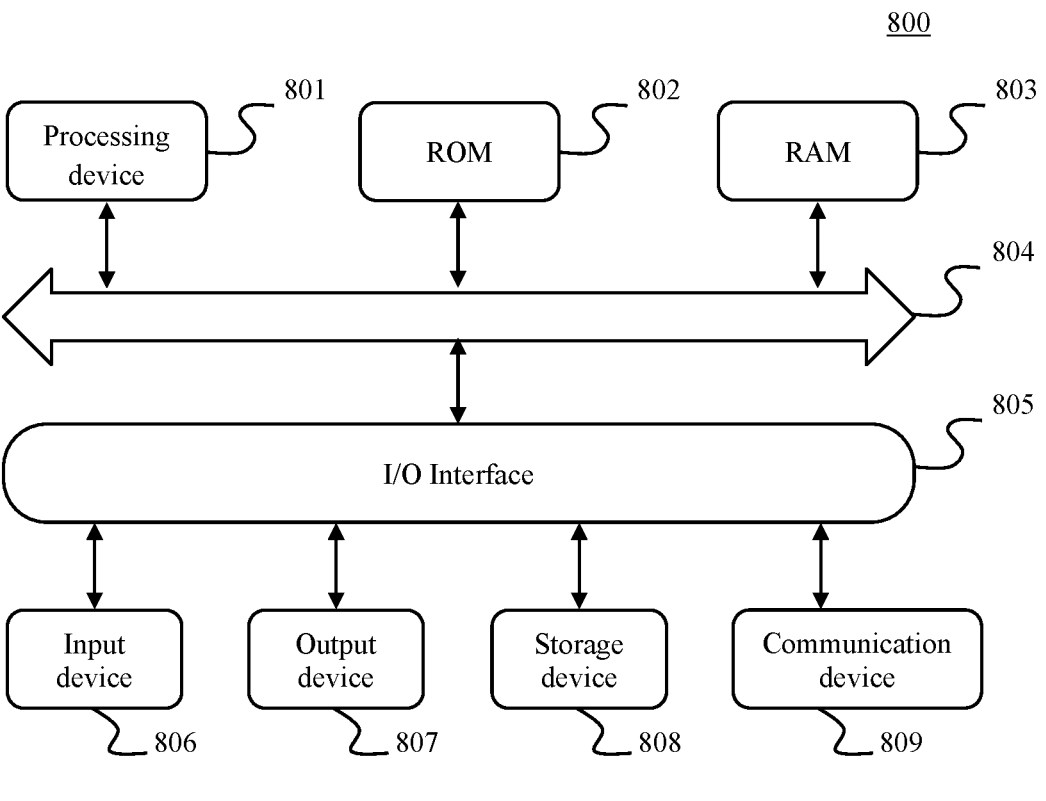
FIG. 6 illustrates a structural schematic diagram of a terminal for implementing embodiments of the present disclosure.

Referring now to FIG. 6, a structural schematic diagram of terminal 800 suitable for implementing an embodiment of the disclosure is shown. The terminal equipment in the embodiment of the disclosure can include, but is not limited to, mobile terminals such as a mobile phone, a notebook computer, a digital broadcast receiver, a personal digital assistant (PDA), a Pad, a portable media player (PMP) and a vehicle-mounted terminal (e.g., vehicle-mounted navigation terminal), and fixed terminals such as a digital TV and a desktop computer. The terminal equipment shown in FIG. 6 is only an example, and should not bring any restrictions on the functions and application scope of the embodiments of the present disclosure.

As shown in FIG. 6, the terminal 800 can comprise a processing device 801 (e.g., central processing unit, graphics processor, etc.), which can perform various appropriate actions and processing according to a program stored in a read-only memory (ROM) 802 or a program loaded into a random-access memory (RAM) 803 from a storage device 808. In the RAM 803, various programs and data required for the operation of the terminal 800 are also stored. The processing device 801, the ROM 802, and the RAM 803 are connected through a bus 804. An Input/Output (I/O) interface 805 is also connected to the bus 804.

Generally, the following devices can be connected to the I/O interface 805: an input device 806 such as a touch screen, a touch pad, a keyboard, a mouse, a camera, a microphone, an accelerometer, and a gyroscope; an output device 807 such as a liquid crystal display (LCD), a speaker and a vibrator; a storage device 808 such as a magnetic tape and a hard disk; and a communication device 809. The communication device 809 can allow the terminal 800 to perform wireless or wired communication with other equipment to exchange data. Although FIG. 6 shows the terminal 800 with various devices, it should be understood that it is not required to implement or provide all the devices shown. More or fewer devices may alternatively be implemented or provided.

Particularly, according to the embodiments of the disclosure, the processes described above with reference to the flowcharts may be implemented as computer software programs. For example, the embodiments of the disclosure comprise a computer program product comprising a computer program carried by a computer-readable medium, and the computer program contains program codes for executing the method shown in the flowcharts. In such embodiment, the computer program can be downloaded and installed from a network through the communication device 809, or installed from the storage device 808, or installed from the ROM 802. When the computer program is executed by the processing device 801, the above functions defined in the method of the embodiments of the disclosure are executed.

It should be noted that the above-mentioned computer-readable medium can be a computer-readable signal medium or a computer-readable storage medium or any combination of the two. The computer-readable storage medium may be, for example, but not limited to, an electrical, magnetic, optical, electromagnetic, infrared or semiconductor system, device or component, or any combination of the above. More specific examples of the computer-readable storage medium may include, but are not limited to, an electrical connector with one or more wires, a portable computer disk, a hard disk, an RAM, an ROM, an electrically erasable programmable read only memory (EPROM) or flash memory, an optical fiber, a portable compact disc read-only memory (CD-ROM), an optical storage device, a magnetic storage device, or any suitable combination of the above. In the disclosure, the computer-readable storage medium can be any tangible medium containing or storing a program, which can be used by or in combination with an instruction execution system, device, or component. In the disclosure, the computer-readable signal medium can comprise a data signal propagated in a baseband or as part of a carrier wave, in which computer-readable program codes are carried. This propagated data signal can take various forms, including but not limited to an electromagnetic signal, an optical signal, or any suitable combination of the above. The computer-readable signal medium can also be any computer-readable medium other than the computer-readable storage medium, and the computer-readable signal medium can send, propagate, or transmit the program for use by or in connection with the instruction execution system, device, or component. The program codes contained in the computer-readable medium can be transmitted by any suitable medium, including but not limited to electric wire, optical cable, radio frequency (RF) or any suitable combination of the above.

In some embodiments, the client and the server can use any currently known or future developed network protocols such as HTTP (Hypertext Transfer Protocol) to communicate, and can communicate with any form or medium digital data communications (e.g., communications networks) interconnected. Examples of communication networks include local area networks ("LAN"), wide area networks ("WAN"), the Internet, and peer-to-peer networks (e.g., ad hoc peer-to-peer networks), as well as any currently known or future developed network.

The computer-readable medium can be included in the terminal equipment, and can also exist alone without being assembled into the terminal equipment.

The computer-readable medium carries one or more programs, and when the one or more programs are executed by the terminal equipment, the terminal equipment is caused to: in response to receiving a first creation operation in a document, create a first content block, wherein the first content block comprises an interactive region and the first content block is of a first type; generate a first editing region in response to a first triggering operation on the first content block, the first editing region being configured to edit the first content block; and update content of the interactive region of the first content block in the document based on input information received in the first editing region.

Or the computer-readable medium carries one or more programs, and when the one or more programs are executed by the terminal equipment, the electronic device is caused to: receive first information and source information from a server, wherein the source information is determined based on an association relation between an account that currently logs in a client and a source of the first information and the first information is generated based on first original information within the source; and display the first information and the source information.

Or the computer-readable medium carries one or more programs, and when the one or more programs are executed by the terminal equipment, the electronic device is caused to: in response to receiving a second creation operation in a document, create a second content block, wherein the second content block is of a second type, the second content block comprises a second editing region, and the second editing region is configured to edit the document; in response to a third triggering operation on the second content block, generate a third editing region, the third editing region being configured to compile the second content block; and update a block type and/or content of the second content block in the document based on input information received in the third editing region.

Computer program codes for performing the operations of the disclosure can be written in one or more programming languages or a combination thereof, including object-oriented programming languages such as JAVA®, SMALL-TALK®, C++, and conventional procedural programming languages such as "C" language or similar programming languages. The program code can be completely or partially executed on a user computer, executed as an independent software package, partially executed on a user computer, and partially executed on a remote computer, or completely executed on a remote computer or server. In a case involving a remote computer, the remote computer can be connected to a user computer through any kind of network including a local area network (LAN) or a wide area network (WAN), or can be connected to an external computer (e.g., connected through the Internet using an Internet service provider).

The flowcharts and block diagrams in the drawings show the architectures, functions, and operations of possible implementations of systems, methods, and computer program products according to various embodiments of the disclosure. In this regard, each block in the flowchart or block diagram can represent a module, a program segment or part of a code that contains one or more executable instructions for implementing a specified logical function. It should also be noted that in some alternative implementations, the functions noted in the blocks can also occur in a different order from those noted in the drawings. For example, two consecutive blocks can actually be executed in substantially parallel, and sometimes they can be executed in reverse order, depending on the functions involved. It should also be noted that each block in the block diagrams and/or flowcharts, and combinations of blocks in the block diagrams and/or flowcharts, can be implemented with dedicated hardware-based systems that perform specified functions or actions, or can be implemented with combinations of dedicated hardware and computer instructions.

The modules or units described in the embodiments of the disclosure can be implemented by software or hardware. The name of a module or unit does not constitute a limitation to the module or unit itself under certain circumstances.

The functions described herein above may be performed, at least in part, by one or more hardware logic components. For example, exemplary types of hardware logic components that may be used include: Field Programmable Gate Arrays (FPGAs), Application Specific Integrated Circuits (ASICs), Application Specific Standard Products (ASSPs), Systems on Chips (SOCs), Complex Programmable Logical Devices (CPLDs) and etc.

In the context of the present disclosure, a machine-readable medium may be a tangible medium that may contain or store programs for use by or in combination with an instruction execution system, device, or device. The machine-readable medium may be a machine-readable signal medium or a machine-readable storage medium. Machine readable media may include, but are not limited to, electronic, magnetic, optical, electromagnetic, infrared, or semiconductor systems, devices or devices, or any suitable combination of the above. More specific examples of machine-readable storage media will include electrical connections based on one or more lines, portable computer disks, hard disks, random access memory (RAM), read only memory (ROM), erasable programmable read only memory (EPROM or flash memory), optical fibers, portable compact disk read only memory (CD-ROM), optical storage devices, magnetic storage devices or any suitable combination of the above.

One aspect of the disclosure provides a method for document editing, comprising:

in response to receiving a first creation operation in a document, creating a first content block, wherein the first content block comprises an interactive region and the first content block is of a first type;

generating a first editing region in response to a first triggering operation on the first content block, the first editing region being configured to edit the first content block; and updating content of the interactive region of the first content block in the document based on input information received in the first editing region.

In some embodiments, the generating a first editing region comprises:

replacing the interactive region by the first editing region.

In some embodiments, the method further comprises:

prior to the updating content of the interactive region of the first content block in the document, receiving a second triggering operation at an interface where the first editing region is located; and in response to the second triggering operation, updating the content of the interactive region of the first content block in the document.

In some embodiments, the generating a first editing region comprises:

generating the first editing region at an associated region of the interactive region, wherein the interactive region and the first editing region are displayed simultaneously.

The method of claim 4, wherein the updating content of the interactive region of the first content block in the document based on the input information received in the first editing region comprises:

updating the content of the interactive region in real-time in response to receiving input information in the first editing region.

In some embodiments, the method further comprises:

hiding the first editing region; or adjusting a display scale of the first editing region.

In some embodiments, the method further comprises:

creating a connection file;

retrieving a target module in a database through the connection file;

acquiring a dependency tree of the target module; and recursively parsing the target module based on the dependency tree to obtain a target file.

In some embodiments, the creating a connection file comprises:

acquiring a call instruction;

replacing the call instruction with a target instruction; and taking the target instruction as the connection file;

wherein the target module comprises an asynchronous module, a global variable export module or a cascading style sheets module.

In some embodiments, the method further comprises:

acquiring instruction information for re-editing the content block; and re-editing the content block based on the instruction information, and acquiring an editing result.

In some embodiments, the method further comprises:

defining a creator of the content block as a host;

determining a sender of the instruction information;

if the sender is not the host, sending the instruction information to the host, and executing the instruction information by the host; and returning the editing result to the sender;

wherein the instruction information comprises: a replacing operation, an inserting operation, and a removing operation.

Another aspect of the disclosure provides a method for document editing, comprising:

in response to receiving a second creation operation in a document, creating a second content block, wherein the second content block is of a second type, the second content block comprises a second editing region, and the second editing region is configured to edit the document;

in response to a third triggering operation on the second content block, generating a third editing region, the third editing region being configured to compile the second content block; and updating a block type and/or content of the second content block in the document based on input information received in the third editing region.

Yet another aspect of the disclosure provides an apparatus for document editing, comprising:

a creation module, configured to, in response to receiving a first creation operation in a document, create a first content block, wherein the first content block comprises an interactive region and the first content block is of a first type, or configured to, in response to receiving a second creation operation in a document, create a second content block, wherein the second content block is of a second type, the second content block comprises a second editing region configured to edit the document;

a generation module, configured to generate a first editing region in response to a first triggering operation on the first content block, the first editing region being configured to edit the first content block, or configured to, in response to a third triggering operation on the second content block, generate a third editing region, the third editing region being configured to compile the second content block; and an updating module, configured to update content of the interactive region of the first content block in the document based on input information received in the first editing region, or configured to update a block type and/or content of the second content block in the document based on input information received in the third editing region.

Yet another aspect of the disclosure provides a terminal, comprising: at least one memory and at least one processor; wherein the at least one memory is configured to store program code, and the at least one processor is configured to execute the program code stored by the at least one memory to perform the method above.

Yet another aspect of the disclosure provides a non-transitory storage medium, storing program instructions that upon execution by a computing device, cause the computing device to perform the method above.

The above description is only a preferred embodiment of the present disclosure and an illustration of the technical principles utilized. It should be understood by those skilled in the art that the scope of the present disclosure is not limited to technical solutions formed by a particular combination of the above technical features, but also covers other technical solutions formed by any combination of the above technical features or their equivalent without departing from the above disclosed concept. For example, a technical solution formed by interchanging the above features with (but not limited to) technical features with similar functions disclosed in the present disclosure.

In addition, although the operations are depicted in a specific order, it should not be understood as requiring these operations to be performed in the specific order shown or performed in a sequential order. Under certain circumstances, multitasking and parallel processing may be advantageous. Likewise, although several specific implementation details are included in the above discussion, these should not be construed as limiting the scope of the disclosure. Certain features that are described in the context of separate embodiments may also be implemented in combination in a single embodiment. Conversely, various features that are described in the context of a single embodiment may also be implemented in multiple implementations individually or in any suitable sub-combination.

Although the subject matter has been described in a language specific to structural features and/or logical actions of the method, it should be understood that the subject matter defined in the appended claims is not necessarily limited to the specific features or actions described above. On the contrary, the specific features and actions described above are merely exemplary forms of implementing the claims.

What is claimed is:

1. A method for editing a document, comprising:
    displaying the document that comprises a plurality of content blocks, wherein each of the plurality of content blocks comprises content of the document, and the content of the document in each of the plurality of content blocks is stored based on a corresponding content block;
    receiving a predetermined symbol in the document and receiving a selection of a first content block from the plurality of content blocks, wherein the first content block comprises an interactive region, and the interactive region of the first content block is configured to control display of the content in the first content block based on user interactions;
    generating a first editing region in response to receiving the predetermined symbol in the document and the selection of the first content block, wherein the first editing region is configured to edit content in the interactive region of the first content block, and wherein the predetermined symbol is configured to call an operational panel of the first editing region;
    simultaneously displaying the first editing region and the interactive region of the first content block; and
    updating the content in the interactive region of the first content block in the document based on input information received in the first editing region.

2. The method of claim 1, wherein the generating a first editing region comprises:
    replacing the interactive region by the first editing region.

3. The method of claim 2, further comprising:
    prior to the updating content of the interactive region of the first content block in the document, receiving a second triggering operation at an interface where the first editing region is located; and
    in response to the second triggering operation, updating the content of the interactive region of the first content block in the document.

4. The method of claim 1, wherein the generating a first editing region comprises:
    generating the first editing region at an associated region of the interactive region, wherein the interactive region and the first editing region are displayed simultaneously.

5. The method of claim 4, wherein the updating content of the interactive region of the first content block in the document based on the input information received in the first editing region comprises:
    updating the content of the interactive region in real-time in response to receiving input information in the first editing region.

6. The method of claim 1, further comprising:
    hiding the first editing region; or
    adjusting a display scale of the first editing region.

7. The method of claim 1, further comprising:
    creating a connection file;
    retrieving a target module in a database through the connection file;
    acquiring a dependency tree of the target module; and
    recursively parsing the target module based on the dependency tree to obtain a target file.

8. The method of claim 7, wherein the creating a connection file comprises:
    acquiring a call instruction;
    replacing the call instruction with a target instruction; and
    taking the target instruction as the connection file;
    wherein the target module comprises an asynchronous module, a global variable export module or a cascading style sheets module.

9. The method of claim 1, further comprising:
    acquiring instruction information for re-editing the content block; and
    re-editing the content block based on the instruction information, and acquiring an editing result.

10. The method of claim 9, further comprising:
    defining a creator of the content block as a host;
    determining a sender of the instruction information;
    in response to determining that the sender is not the host, sending the instruction information to the host, and executing the instruction information by the host; and
    returning the editing result to the sender;
    wherein the instruction information comprises: a replacing operation, an inserting operation, and a removing operation.

11. A method for editing a document, comprising:
    displaying the document that comprises a plurality of content blocks, wherein each of the plurality of content blocks comprises content of the document, and the content of the document in each of the plurality of content blocks is stored based on a corresponding content block;
    receiving a predetermined symbol in the document and receiving a selection of a content block from the plurality of content blocks, wherein the content block is of a type among a plurality of types, the content block comprises a first editing region, and the first editing region is configured to edit the document;

in response to receiving the predetermined symbol and the selection of the content block, generating a second editing region, wherein the second editing region is configured to compile the content block, and wherein the predetermined symbol is configured to call an operational panel of the second editing region;

simultaneously displaying the second editing region and the content block; and updating the type and content of the content block in the document based on input information received in the second editing region.

12. An apparatus for editing a document, comprising:

at least one processor; and at least one memory communicatively coupled to the at least one processor and storing instructions that upon execution by the at least one processor cause the apparatus to:

display the document that comprises a plurality of content blocks, each of the plurality of content blocks comprises content of the document, and the content of the document in each of the plurality of content blocks is stored based on a corresponding content block;

receive a predetermined symbol in the document and receiving a selection of a first content block from the plurality of content blocks, wherein the first content block comprises an interactive region, and the interactive region of the first content block is configured to control display of the content in the first content block based on user interactions;

generate a first editing region in response to receiving the predetermined symbol in the document and the selection of the first content block, wherein the first editing region is configured to edit content in the interactive region of the first content block, and wherein the predetermined symbol is configured to call an operational panel of the first editing region;

simultaneously display the first editing region and the interactive region of the first content block; and update the content in the interactive region of the first content block in the document based on input information received in the first editing region.

13. An apparatus for editing a document, comprising:

at least one processor; and at least one memory communicatively coupled to the at least one processor and storing instructions that upon execution by the at least one processor cause the apparatus to:

display the document that comprises a plurality of content blocks, wherein each of the plurality of content blocks comprises content of the document, and the content of the document in each of the plurality of content blocks is stored based on a corresponding content block;

receive a predetermined symbol in the document and receiving a selection of a content block from the plurality of content blocks, wherein the content block is of a type among a plurality of types, the content block comprises a first editing region, and the first editing region is configured to edit the document;

in response to receiving the predetermined symbol and the selection of the content block, generate a second editing region, wherein the second editing region is configured to compile the content block, and wherein the predetermined symbol is configured to call an operational panel of the second editing region;

simultaneously display the second editing region and the content block; and update the type and content of the content block in the document based on input information received in the second editing region.

* * * * *